United States Patent [19]

Jarman

[11] Patent Number: 4,875,177
[45] Date of Patent: Oct. 17, 1989

[54] DATUMING OF ANALOGUE MEASUREMENT PROBES

[75] Inventor: Thomas B. Jarman, Cirencester, United Kingdom

[73] Assignee: Renishaw plc, Wotton-under-Edge, United Kingdom

[21] Appl. No.: 103,752

[22] Filed: Oct. 2, 1987

[30] Foreign Application Priority Data

Oct. 8, 1986 [GB] United Kingdom ............. 8624191

[51] Int. Cl.$^4$ .................................... G01C 25/00
[52] U.S. Cl. ........................ 364/559; 364/474.35; 33/504
[58] Field of Search ............ 364/571.02, 560, 559, 364/474.36, 474.35, 474.37, 474.03, 571.05; 33/503, 504, 505; 356/376, 375, 123, 6

[56] References Cited

U.S. PATENT DOCUMENTS

| | | | |
|---|---|---|---|
| 3,983,374 | 9/1976 | Sorenson, III et al. | 364/474.03 |
| 4,296,473 | 10/1981 | Imazeki et al. | 364/520 |
| 4,585,350 | 4/1986 | Pryor | 356/376 |
| 4,636,960 | 1/1987 | McMurty | 364/474.35 |
| 4,639,140 | 1/1987 | Lerat | 356/376 |
| 4,647,209 | 3/1987 | Neukomm et al. | 356/376 |
| 4,660,970 | 4/1987 | Ferrano | 356/1 |
| 4,688,184 | 8/1987 | Taniguti et al. | 364/560 |
| 4,705,395 | 11/1987 | Hageniers | 356/1 |
| 4,708,483 | 11/1987 | Lorenzo | 356/376 |
| 4,721,388 | 1/1988 | Takagi et al. | 356/376 |
| 4,743,770 | 5/1988 | Lee | 250/560 |
| 4,819,195 | 4/1989 | Bell et al. | 364/571.05 |

FOREIGN PATENT DOCUMENTS

| | | |
|---|---|---|
| 1477508 | 6/1977 | United Kingdom . |
| 2060888 | 5/1981 | United Kingdom . |
| 8701886 | 3/1987 | World Int. Prop. O. . |

OTHER PUBLICATIONS

"3 Dimensional Touch Trigger Probes for Measuring Machines", Dec. 1983, Renishaw Electrical ltd., pp. 1–20.
"OP2 Laser Scanning Probe–Users Manual"–(Provisional Issue 1), Renishaw Metrology, Spring 1986.

Primary Examiner—Parshotam S. Lall
Assistant Examiner—S. A. Melnick
Attorney, Agent, or Firm—Spencer & Frank

[57] ABSTRACT

An optical analogue probe (9) is used on a co-ordinate measuring machine (1). Prior to use, it is datumed to compensate for any misalignment of the angle ($\theta$) of its measurement axis (12A) from each of the machine's axes (X,Y,Z). Trigger points (D2,D3) are defined near opposite ends of the probe's measurement range (MR). A first set of machine X,Y,Z co-ordinates of at least four points (40) on a test sphere (38) are taken at one probe trigger point (D2). A corresponding set of co-ordinates for another four points (44) are taken at the other trigger point (D3). For each set of co-ordinates, a calculation is made of the center of the sphere, giving respective center points (42,46). The vector between these center points (42,46) is parallel to the measurement axis (12A) of the probe (9). From this vector, direction cosines are calculated for correcting the probe output to give X,Y and Z values.

8 Claims, 4 Drawing Sheets

DATUMING OF ANALOGUE MEASUREMENT PROBES

FIELD OF THE INVENTION

This invention relates to the use of analogue probes for measuring the dimensions of a workpiece on position determining apparatus such as a machine tool, a co-ordinate measuring machine (CMM) or an inspection robot. It is particularly (though not exclusively) applicable to the use of probes having a single measurement axis, e.g. optical analogue probes in which a beam of light is reflected from the workpiece to a detector. As used herein, the term "analogue probe" is used to denote a probe giving an output proportional to distance from a surface, as distinct from a trigger output; the output may in fact be in digital rather than analogue form.

DESCRIPTION OF PRIOR ART

Analogue probes are well known for mounting on the movable arm of position determining apparatus such as a machine tool or CMM. The arm of the machine is moved so that the probe is brought into a surface-sensing relationship with a workpiece. The position of the surface is then determined by taking a measurement reading from the apparatus relating to the position of the probe carried on the arm, and adding the output of the probe. Usually a pre-determined offset value is also added into the result, to take account of any difference (the "probe offset") between the position on the arm indicated by the apparatus reading, and the position of a surface sensed by the probe when the probe output is zero (the probe's zero output position). This offset is pre-determined by sensing a fixed datum surface or surfaces.

Some known analogue probes are intended to contact the workpiece surface, and use a transducer (such as a linear variable displacement transducer) to produce an output indicative of the displacement of a surface-contacting probe stylus relative to the probe body. Other known analogue probes work optically, by reflecting a beam of light from the workplace surface onto a detector, which then gives an output depending on the distance of the surface from the probe. In either case, the probe output indicates a distance along an axis (the "measurement axis") of the probe.

In some machine tools and CMM's, the probe is intended to be mounted in the machine arm such that its measurement axis is parallel with an X, Y or Z measurement axis of the machine. In this case, measuring the position of the workpiece surface simply involves adding the probe output to the X, Y or Z measurement reading of the machine, as discussed above. This addition is usually performed by a computer forming part of the machine and programmed to control its operation. In other machine tools and CMMs, where the probe is not mounted parallel to the X, Y or Z axis of the machine, the computer must allow for this. It does so by multiplying the probe output by a "direction cosine", prior to adding it to the machine reading. For each of the X, Y and Z machine axes, there is stored in the computer such a direction cosine, being the cosine of the angle between the probe measurement axis and the X, Y or Z axis respectively of the machine. Where the probe is mounted on the machine arm via a head which is capable of assuming any of a number of pre-determined angles relative to the machine axes, the computer stores a set of direction cosines for each such angle.

However, in the first of these two cases, if the probe measurement axis is not accurately aligned parallel with the X, Y or Z axis of the machine as intended, the resulting measurements will be subject to an error. In the second case, the direction cosines are calculated of the basis of the intended or assumed angle of the probe measurement axis to the relevant X, Y or Z machine axis, and errors will similarly be caused should the probe measurement axis not be accurately aligned with this intended angle. Such misalignments may be caused, for example, as a result of manufacturing tolerances of the probe and of the mounting arrangement of the probe in the arm of the machine.

SUMMARY OF THE INVENTION

The present invention relates to a method of datuming an analogue probe in order to provide a value or values which can be used to correct partially or wholly for the errors noted above.

One aspect of the invention provides a method of using an analogue measurement probe in position determining apparatus, the probe having an output indicative of the distance of a surface of an object from the probe along a measurement axis of the probe when said distance is within a measuring range of the probe, the apparatus having means for moving the probe relative to a said object and position determining means for taking a reading of the position of the probe with respect to at least one measurement axis of the apparatus, the method comprising:

(a) moving the probe into a plurality of surface-sensing positions with respect to a test said object and using the position determining means to take a first set and a second set of said readings, the readings within each set being in respect of different surface positions of the test object and being sufficient to determine the position of a datum point of the test object, each reading of the first set being taken when the probe output indicates that the probe is at a first point within its measuring range and each reading of the second set being taken when the probe output indicates that the probe is at a second point within its measuring range;

(b) determining a first measured position of said datum point of the test object from the first set of readings and a second measured position thereof from the second set of readings; and (c) deriving from the first and second measured positions a correction factor for use in correcting the probe output.

A second aspect of the invention provides position determining apparatus, including an analogue measurement probe having an output indicative of the distance of a surface of an object from the probe along a measurement axis of the probe when said distance is within a measuring range of the probe, means for moving the probe relative to a said object, position determining means for taking a reading of the position of the probe with respect to at least one measurement axis of the apparatus, and means for performing the above method.

Preferably, the position determining apparatus has three orthogonal said measurement axes, and said readings are of the three-dimensional position of the probe. The correction factor derived in step (c) of the above method is then preferably a direction cosine in respect of each measurement axis of the machine. The test object preferably has a spherical surface, and the datum point of the test object is preferably the centre of the sphere.

BRIEF DESCRIPTION OF THE DRAWINGS

Preferred embodiments of this invention will now be described, by way of example, with reference to the accompanying drawings wherein.

DESCRIPTION OF PREFERRED EMBODIMENTS

Figure 1:
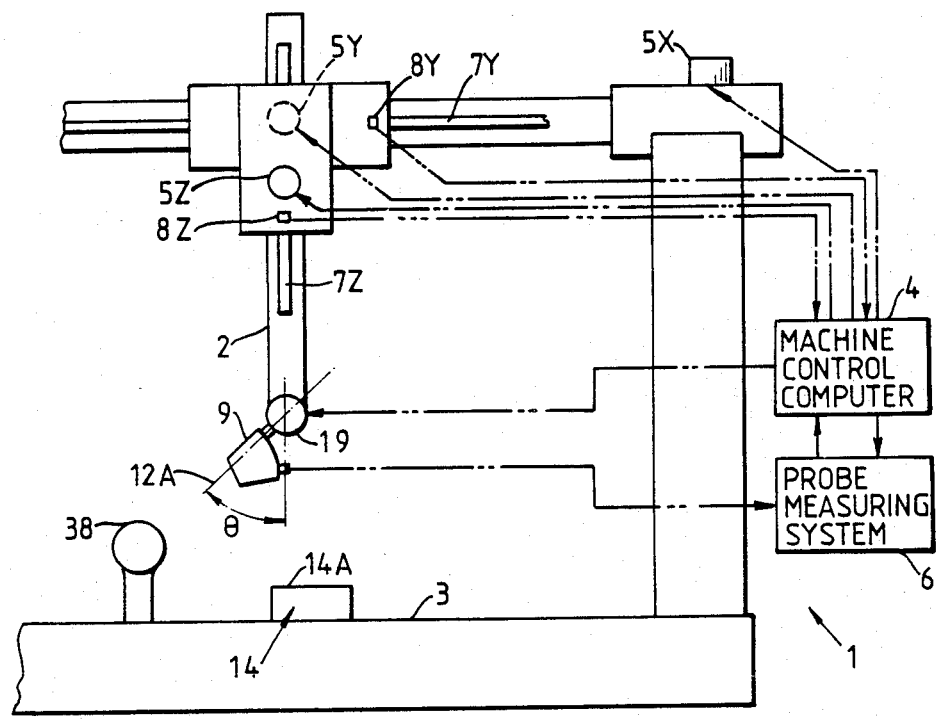
FIG. 1 is an elevation of a part of a co-ordinate measuring machine.

Referring to FIG. 1, the co-ordinate measuring machine, generally denoted 1, comprises an arm member 2 adapted to be moved relative to a table 3 in three dimensions X,Y,Z under the control of a machine control computer 4. The movement in the three dimensions is effected by respective motors 5X,5Y,5Z. The machine 1 is equipped with a machine measuring system which includes sensors 8Y,8Z co-operating with scales 7Y,7Z to provide the computer 4 with Y and Z components of the position of the arm 2, and a similar sensor and scale (not shown) for the X component. A workpiece 14 mounted on the table 3 can be measured by the machine measuring system in terms of the position of the arm 2 relative to an origin, use being made of an analogue position sensing probe 9 secured to the arm 2. The probe 9 has a probe measuring system 6 whereby to determine the position of a point on a surface 14A of the workpiece 14 relative to the arm 2 within a given dimensional range.

Thus the machine measuring system may be used to move the arm 2 to a given position relative to the surface 14A and the probe measuring system may be used to indicate any error (positive or negative) by which the actual position of the surface deviates from the given position. The computer 4 adds this positive or negative error to the reading of the machine measuring system to indicate the true position. These actions are repeated in a measurement cycle under control of the computer 4 until all desired measurements have been taken.

Also shown in FIG. 1 is a motorized probe head 19 which can be indexed under the control of the computer 4 so that the measurement axis 12A of the probe 9 can be orientated into any of a plurality of directions in three dimensions. This is an optional feature which increases the flexibility of use of the probe.

Figure 2:
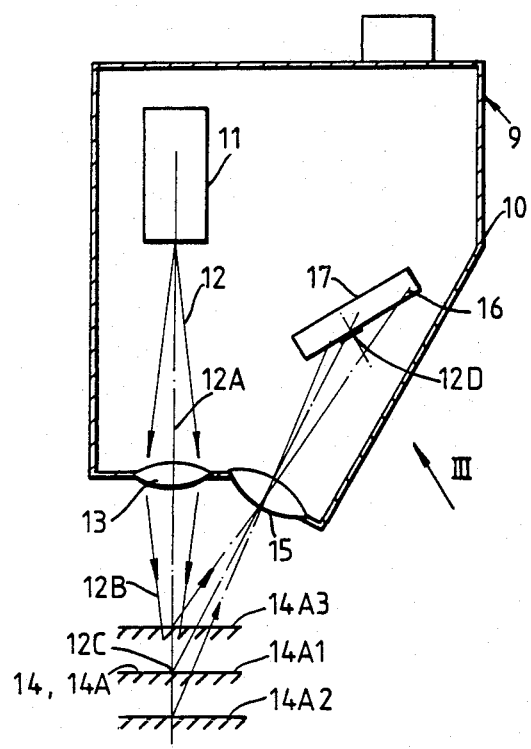
FIG. 2 is a diagrammatic illustration of a probe for sensing position.
Figure 3:
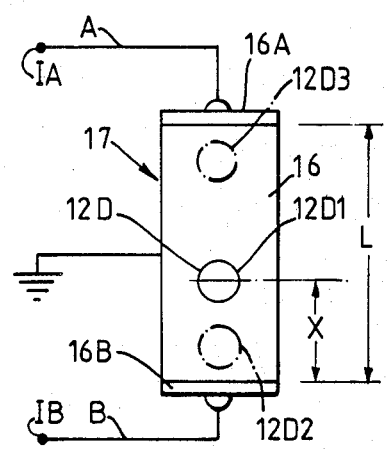
FIG. 3 is an enlarged detail of FIG. 2 as seen in the direction of an arrow III.

Referring to FIGS. 1 to 3, the probe 9 comprises a housing 10 containing an infra-red laser light source 11 producing an incident beam 12 of light, and a lens 13 adapted to converge the beam to a waist 12B. The housing 10 is secured to the member 2. Different relative positions of the surface 14A are denoted 14A1,14A2,-14A3. When, during movement of the member 2, the waist 12B is intersected by the surface 14A, the surface 14A is illuminated at a small spot 12C. The housing 10 includes a lens 15 adapted to image the spot 12C onto a light-sensitive surface 16 of a transducer 17, there to form a spot 12D. Movement of the probe 9 in the direction of the axis 12A results in a change of the position of the spot 12D between positions 12D1,12D2,12D3 corresponding to the relative surface positions 14A1,-14A2,14A3. The spot 12D causes photo-current to be generated at electrodes 16A,16B of the transducer 17. The relative magnitude of the resulting currents IA,IB (in respective lines A,B connected to the electrodes 16A,16B) is a measure of the relative position of the member 2 and the surface 14A, and can be determined as described in International Patent Application Publication No WO 87/01886. The probe measuring system 6 is arranged to give an output accordingly to the machine control computer 4 whenever requested to do so by that computer.

As described thus far, the machine is similar to known arrangements. There will now be described a novel method for datuming the probe 9, to allow for possible misalignment of the measurement axis 12A of the probe. As discussed above, the actual alignment of the axis 12A relative to the X, Y and Z axes of the machine when the motorised head 19 is in a given position may not be exactly equal to the theoretical alignment predicted. At a suitable point or points in the measurement cycle, the following datuming method is therefore undertaken for each index position of the motorized head used in the cycle. Even if the motorised head is omitted and the probe 9 is mounted directly to the arm 2, the probe measurement axis 12A may not be exactly aligned with the machine Z axis (or X or Y axis, as the case might be), and so the following datuming method is used at least once in the cycle.

Figure 4:
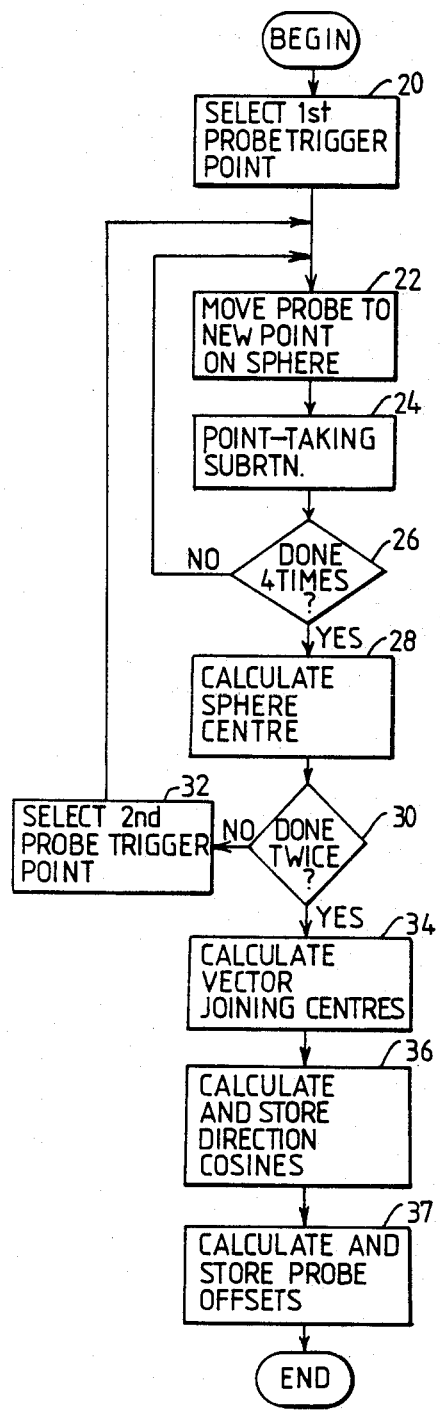
FIGS. 4 and 5 are flowcharts of alternative datuming methods for use with the apparatus of FIGS. 1 to 3.

Referring to FIG. 4, a program for performing the method is provided for the machine control computer 4. The first step 20 of the program is to select a point in the output range of the probe 9 to act as a first trigger point. This point should be close to one end of the measurement range of the probe, and may for example correspond to the point 12D2 shown in FIG. 3. If the measurement range of the probe is as shown between the arrows MR in FIG. 6, then the selected trigger point may be the point D2 close to one end of the range.

Next, in step 22, the computer 4 drives the motors 5X,5Y,5Z so as to move the probe 9 into a surface-sensing relationship with an arbitrarily chosen point on the surface of a test sphere 38, which is provided at a convenient location on the table 3 of the machine. The surface point on the sphere 38 need not be chosen with great accuracy, and indeed great accuracy would be difficult to achieve since the probe has not yet been datumed.

In step 24, with the probe output showing the sphere's surface to be at the trigger point D2 of the probe's range, the computer takes the X,Y, and Z co-ordinates from the machine axis sensors 8X,8Y,8Z. This is accomplished by an appropriate subroutine, and three possible subroutines are described below with reference to FIGS. 7 to 9. Next, the probe is moved to a different arbitrarily chosen point on the surface of the sphere by repeating step 22, and the X,Y and Z co-ordinates of the new point are taken in the same fashion, repeating step 24. This process is repeated (step 26) until the co-ordinates of a set of at least four such points have been taken. The four points are represented in the schematic diagram FIG. 6 by dots enclosed by small circles, denoted by reference numerals 40, and although FIG. 6 shows them to be co-planar, this is not the case in practice.

The X,Y and Z co-ordinate data from the four points 40 is sufficient to enable the computer 4 to calculate the position of the centre of the test sphere 38, which provides a datum point. This calculation is performed in step 28. Algorithms for this purpose are well known. It will be appreciated that where the test object is a sphere, four is the minimum number of points to enable this calculation. If desired, however, accuracy can be improved by taking more than four points. Furthermore, although we prefer to use a sphere as the test object since this is most convenient, it would be possible to use test objects of other regular shapes, taking sufficient number of points to fully define an appropriate datum point of the object. The centre datum point of the sphere 38 as calculated in step 28 is shown by the reference numeral 42 in FIG. 6, and is not the true centre point of the sphere. This is because the machine X,Y and Z co-ordinates take no account of the measurement offsets introduced by the probe itself.

Figure 6:
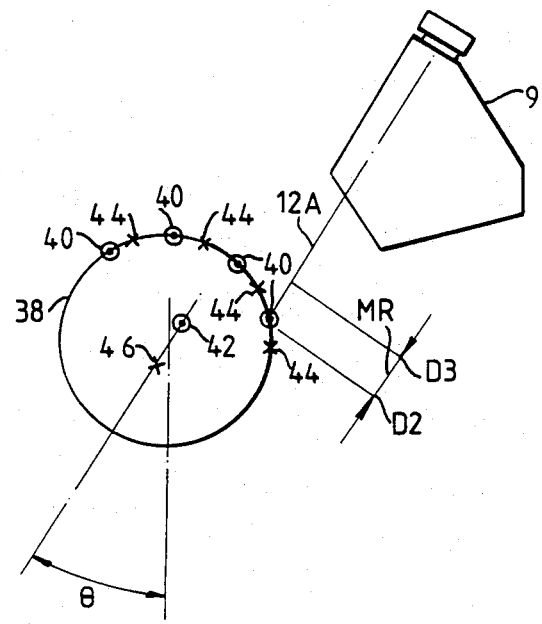
FIG. 6 is a schematic enlargement of a detail of FIG. 1, and, FIGS. 7 to 9 are flowcharts of alternative subroutines for use in the methods of FIGS. 4 and 5.

Next, the whole process is repeated (step 30), to take the co-ordinates of another set of four or more points 44 on the surface of the sphere 38, represented by small crosses in FIG. 6, and to calculate another centre datum point 46. This time, however, the co-ordinates are taken at a different trigger point in the measurement range MR of the probe, selected at step 32. This second trigger point should preferably be close to the opposite end of the probe's measuring range, compared with the first, and may for example be the point D3 (FIG. 6) corresponding to point 12D3 (FIG. 3).

The resulting calculated center datum point 46 is again not the true centre point of the sphere, because of the probe offsets in the three directions X,Y, and Z. However, referring to FIG. 6, the vector from the centre point 46 to the centre point 42 will necessarily have the same magnitude as and be parallel to the vector from the point D2 to the point D3. It follows that this vector will be parallel to the true measuring axis 12A of the probe, irrespective of any misalignment of the probe and its mounting arrangement.

Accordingly, in step 34 of the program, the computer 4 proceeds to calculate details of this vector (i.e. its angle $\theta$ to each of the X,Y and Z machine axis), and in step 36 it calculates and stores a direction cosine for each of these axis, being the cosine of the corresponding angle $\theta$.

The stored direction cosines could, if desired, now be used in calculating X,Y and Z offsets of the probe's zero output position, relative to the arm 2, in an entirely conventional probe datuming operation using fixed X,Y and Z datum surfaces. These probe offsets allow for the fact that the machine X,Y and Z readings do not necessarily indicate the probe's zero output position, but rather indicate a point having a fixed offset from that position. Such a conventional datuming operation would be made more accurate by the use of the measured direction cosines, rather than theoretical, assumed direction cosines as previously used. However, assuming the true position of the centre of the test sphere 38 to be an appropriate datum point, it will be appreciated that such an additional probe offset datuming step is unnecessary, as the computer 4 already has sufficient data to calculate the probe offsets. The X,Y,Z offsets of the zero point of the probe's measuring range correspond to the true centre point of the test sphere 38, and can be derived from the measured X,Y,Z co-ordinates of one or both of the points 42,46 using the known probe output values at D2 and/or D3 (i.e. the selected trigger points) and the stored direction cosines. This is done in step 37 of the program, and the X,Y and Z probe offsets are stored.

In future use of the probe and machine to measure a workpiece 14, the computer brings the probe into a sensing relationship with the workpiece, and reads the X,Y and Z machine co-ordinates and the probe output. To obtain a corrected X co-ordinate, it then multiplies the probe output by the stored X-axis direction cosine. The machine-indicated X co-ordinate and the stored probe X offset are then added to the result. Corrected Y and Z co-ordinates are obtained similarly.

Figure 5:
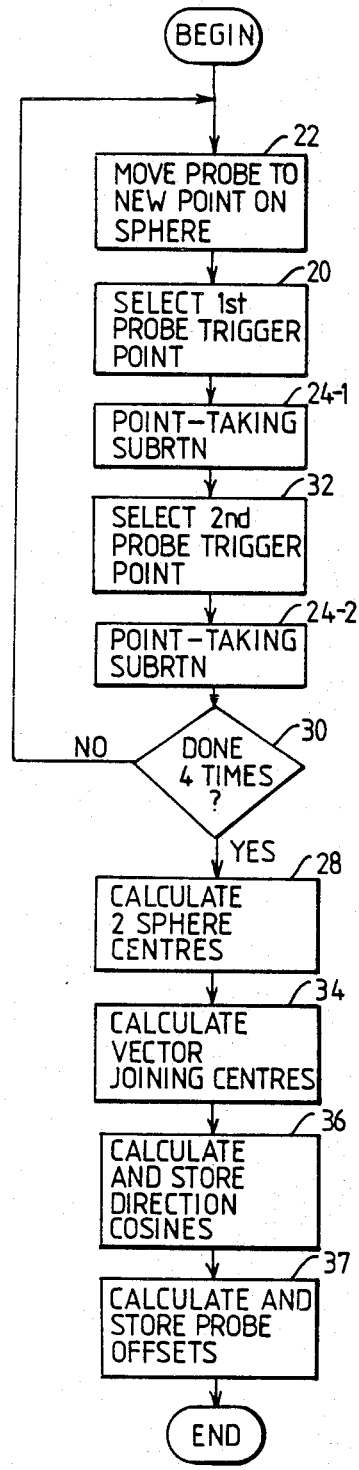

FIG. 5 shows a modification of the program of FIG. 4. Here, the computer takes the co-ordinates of the points 40 in alternation with those of the points 44, in steps 24-1 and 24-2 respectively. Thus, corresponding points 40,44 will be at approximately identical locations on the surface of the sphere. The two sphere centre datum points 42, 46 are then both calculated (step 28) after all the co-ordinates of both sets have been taken. In other respects, the FIG. 5 program steps resemble those of FIG. 4, and the same reference numerals have been used, so that further description is not necessary. The advantage of the method of FIG. 5 is that less probe movement is likely to be needed, so that datuming can be accomplished more quickly.

Figure 7:
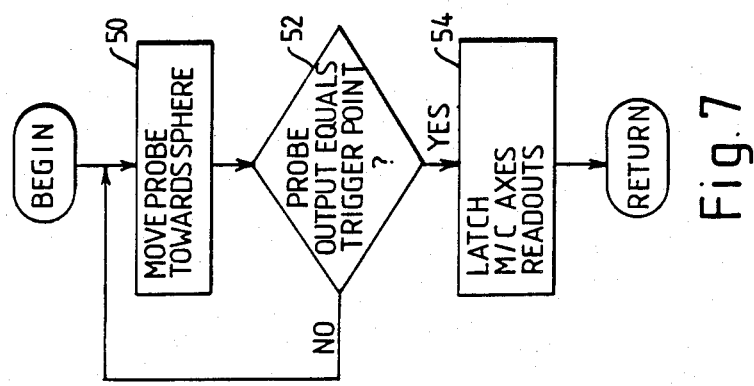

FIG. 7 shows a simple subroutine for taking the X,Y and Z co-ordinates at the selected probe trigger point (step 24,24-1 or 24-2 in FIGS. 4 and 5). In step 50, the computer moves the probe towards the surface of the sphere. This continues until the probe output becomes equal to or goes beyond the selected trigger point (step 52), whereupon the computer latches and records the X,Y and Z outputs of the sensors 8X,8Y and 8Z (step 54).

Figure 8:
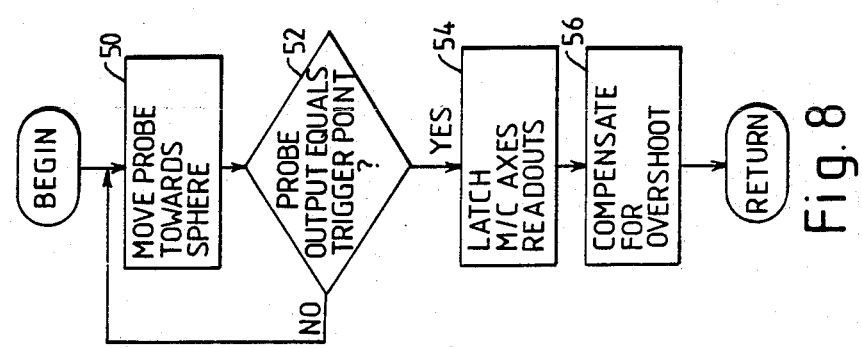

However, this simple method can give rise to inaccuracy, because the probe will still be moving at the time the X,Y and Z co-ordinates are latched. Since it will take a finite time to detect that the trigger point has been reached and to latch the co-ordinates, there will inevitably be a small overshoot. As an alternative to FIG. 7, FIG. 8 shows the same subroutine, but with the addition of a step 56 to compensate for this overshoot. This compensation is calculated for each of the X,Y and Z directions by assuming a value for the inherent delay before latching takes place, assuming a value for the component of the probe velocity in the relevant direction, and assuming that there is no misalignment of the probe measurement axis from its intended orientation (so that a theoretically derived direction cosine can be used in the calculation). Alternatively, the latching step 56 can be carried out by stopping the machine near the trigger point so as to be able to take exact readings of the machine X,Y and Z co-ordinate readouts and of the probe output, and the compensation step 56 then uses theoretically derived direction cosines to calculate approximate values for X,Y and Z at the probe trigger point. However, either method makes assumptions, and therefore the resulting compensation, although useful for many purposes and better than no compensation at all, will only be a first approximation of the compensation truly required.

Figure 9:
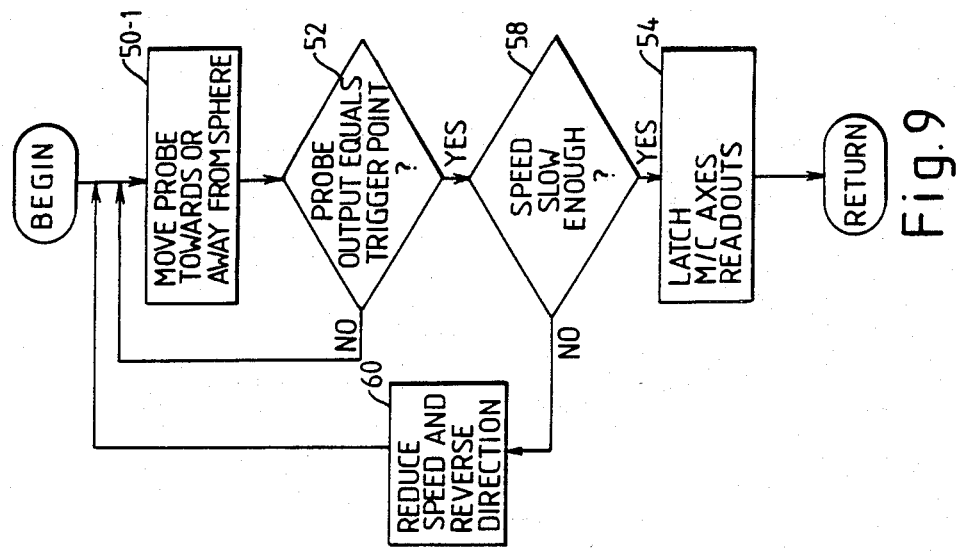

A better alternative subroutine is therefore shown in FIG. 9. Here, steps 50-1 and 52 initially act in an identical manner to steps 50 and 52 of FIG. 7, moving the probe towards the sphere until the trigger point is reached. However, the direction of probe movement is then reversed and the process repeated at a slower speed (steps 58 and 60) until eventually the trigger point is reached at a speed which is sufficiently slow that one can have confidence that any overshoot would be negligible. The X,Y and Z co-ordinates are than latched, as previously (step 54). Normally about three iterations of this process (forwards, backwards and then forwards again) will be adequate.

FIGS. 7 to 9 are examples which use software detection of the trigger points D2 and D3. However, there is no reason (other than expense) why these trigger points cannot be detected by hardware. Suitable threshold detectors can be provided in the probe measuring system 6, acting on the computer 4 to cause it to latch the X,Y and Z co-ordinates.

Although described above in relation to a CMM, the same method can be used to datum an analogue probe on other position determining apparatus, including inspection robots, and machine tools such as lathes or machining centres with two, three or more axes of movement.

I claim:

1. A method of datuming an analogue measurement probe in position determining apparatus, the probe having an output indicative of a distance of a surface of an object from the probe along a measurement axis of the probe when the distance is within a measuring range of the probe, the apparatus having means for moving the probe relative to the object and position determining means for taking a reading of the position of the probe with respect to at least one measurement axis of the apparatus, the method comprising:
   (a) providing a test object having a datum point;
   (b) moving the probe into a plurality of surface-sensing positions with respect to the test object and using the position determining means to take a first set and a second set of said readings, the readings within each set being in respect of different surface positions of the test object and being sufficient to make a determination from that set of readings of the position of said datum point of the test object, each reading of the first set being taken when the probe output indicates that the probe is substantially at a first point within its measuring range and each reading of the second set being taken when the probe output indicates that the probe is substantially at a second point within its measuring range;
   (c) making a first determination of the position of said datum point of the test object from the first set of readings and a second determination thereof from the second set of readings; and
   (d) deriving from the first and second determinations of the position of said datum point a correction factor for use in correcting the probe output for any angular deviation between the measurement axis of the probe and the measurement axis of the apparatus.

2. A method according to claim 1, wherein step (d) includes determining a vector between the first determination of the position of said datum points and the second determination of the position of said datum point, said correction factor being derived from said vector.

3. A method according to claim 1, wherein the position determining apparatus has three orthogonal measurement axis, and said readings are of the three-dimensional position of the probe.

4. A method according to claim 3, wherein the correction factor derived in step (d) is a direction cosine in respect of each measurement axis of the machine.

5. A method according to claim 1, wherein the test object has a spherical surface.

6. A method according to claim 5, wherein the datum point of the test object is the centre of the sphere.

7. In a position determining apparatus having at least one measurement axis and comprising:
   an analogue measurement probe having an output indicative of a distance of a surface of an object from the probe along a measurement axis of the probe when the distance is within a measuring range of the probe;
   means for moving the probe relative to an object;
   position determining means for taking a reading of the position of the probe with respect to the at least one measurement axis of the apparatus;
   said apparatus further comprising:
   (a) a test object having a datum point;
   (b) means for moving the probe into a plurality of surface-sensing positions with respect to said test object and using the position determining means to take a first set and a second set of readings, the readings within each set being in respect of different surface positions of the test object and being sufficient to make a determination from that set of readings of the position of said datum point of the test object, each reading of the first set being taken when the probe output indicates that the probe is substantially at a first point within its measuring range and each reading of the second set being taken when the probe output indicates that the probe is substantially at a second point within its measuring range;
   (c) means for making a first determination of the position of said datum point of the test object from the first set of readings and a second determination thereof from the second set of readings; and
   (d) means for deriving from the first and second determinations of the position of the datum point a correction factor for use in correcting the probe output for any angular deviation between the measurement axis of said probe and the measurement axis of the apparatus.

8. Position determining apparatus according to claim 7, wherein said test object has a spherical surface.

* * * * *